United States Patent
Gheordunescu et al.

[19]

[11] Patent Number: 6,151,537
[45] Date of Patent: Nov. 21, 2000

[54] METHOD FOR DETERMINING TRACTIVE FORCE REQUIRED AT THE WHEELS OF A VEHICLE

[75] Inventors: Cristian Gheordunescu, Livonia; Donald A. Nawrocki, Grand Blanc, both of Mich.

[73] Assignee: Chrysler Corporation, Auburn Hills, Mich.

[21] Appl. No.: 09/092,375

[22] Filed: Jun. 5, 1998

[51] Int. Cl.$^7$ .............................. G06F 7/00; G06F 17/00
[52] U.S. Cl. ................................ 701/1; 701/10; 701/50; 701/70; 701/82; 296/13; 296/91
[58] Field of Search ................................ 701/50, 70, 82, 701/10, 1; 296/13, 91

[56] References Cited

U.S. PATENT DOCUMENTS

| | | | |
|---|---|---|---|
| 3,695,673 | 10/1972 | Meadows | 296/1 S |
| 3,929,369 | 12/1975 | Blair | 296/1 S |
| 4,964,481 | 10/1990 | Sano et al. | 180/140 |
| 5,428,531 | 6/1995 | Hayafune | 364/424.1 |
| 5,508,924 | 4/1996 | Yamashita | 364/426.03 |
| 5,517,410 | 5/1996 | Nakagawa et al. | 364/424.1 |
| 5,563,792 | 10/1996 | Ander et al. | 364/426.02 |
| 5,921,780 | 7/1999 | Myers | 434/69 |

*Primary Examiner*—William A. Cuchlinski, Jr.
*Assistant Examiner*—Ronnie Mancho
*Attorney, Agent, or Firm*—James R. Yee

[57] ABSTRACT

A method for determining the tractive effort required at the wheels of a vehicle for a given set of operating parameters by taking into account a plurality of variables which affect vehicle performance. A total grade effort value is determined which represents the force required to move the vehicle due to the grade of the surface on which the vehicle is expected to travel. An approximate total rolling effort value is also determined which is representative of the force required to move the vehicles due to the hysteresis of the vehicle's tires. Lastly, an aerodynamic influence factor is determined which represents the total air resistance of the vehicle and any implement such as a trailer being towed by the vehicle. These factors are summed to produce a tractive effort value representative of the total tractive effort that would be required to move the vehicle at a designated speed. The method takes into account the ambient temperature of the environment in which the vehicle is operating as well as the barometric pressure to produce a correction factor which may also be applied to the aerodynamic influence factor to take into account the ambient environment in which the vehicle will be operated.

5 Claims, 3 Drawing Sheets

METHOD FOR DETERMINING TRACTIVE FORCE REQUIRED AT THE WHEELS OF A VEHICLE

BACKGROUND OF THE INVENTION

1. Technical Field

This invention relates to methods for predicting the performance of a motor vehicle under specified conditions, and more particularly to a method for determining the tractive effort required to propel a vehicle at a given speed under a given set of conditions, to thereby aid designers and engineers in predicting the performance of various engine, drive train and aerodynamic configurations of a vehicle during design and testing of the vehicle.

2. Discussion

Often the design engineer and management are faced with difficult/design questions in choosing the proper performance parameters of a new vehicle. Some performance factors to be considered are whether the engine to be used is capable of providing enough power for the tasks which the vehicle will be expected to perform. Such tasks might include towing trailers, boats or other items, traveling frequently in geographic areas where steep grades are frequently encountered or in areas where the altitude may affect the performance of the vehicle engine.

Other factors that the design engineer must consider are the transmission ratios and whether these selected ratios will allow easy, positive engagement in shifting of the transmission under various driving conditions. The engineer must also consider the rear axle ratio and whether the same has been properly selected for the anticipated road and operating conditions which the vehicle will experience.

Still other factors that the designer must consider are the gross vehicle weight (i.e., the weight of the vehicle plus the additional weight "seen" by the vehicle if the vehicle is towing a trailer) and what impact the gross vehicle weight may have on the maximum vehicle speed on various surfaces having various grades. Closely connected with this consideration is whether or not the engine to be used in the vehicle will be powerful enough to provide sufficient power to move the vehicle under all of the wide ranging conditions that the vehicle may be expected to encounter. It would also be helpful for the designer to be able to predict whether a particular transmission, transfer case or axle will perform adequately when packaged with an engine having a particular displacement.

When designing a vehicle, it would also be helpful to be able to predict if the cooling and climate control components anticipated to be used with the vehicle will be sufficient under all of the conditions that one anticipates the vehicle will be used in. Accordingly, a tool which allows the engineer to predict if the components anticipated to be used will be adequate under anticipated driving conditions, and which allows the engineer to establish the working point of the engine or the transmission would be extremely helpful. In particular, a tool which allows the engineer to predict the rejected heat by the vehicle engine, the rejected heat by the vehicle transmission, the fan RPM, the engine RPM and the coolant flow from the water pump would be extremely helpful in predicting whether the cooling and climate control components will be sufficient to perform under strenuous operating conditions that the vehicle may experience when in use.

In view of the foregoing it would therefore be highly desirable to provide a method for determining, based on a variety of input data entered by an engineer or designer, and before assembling and testing of any particular test vehicle, the traction force required at the wheels of a vehicle in order to operate the vehicle under a variety of predetermined conditions and at a variety of designated vehicle speeds. This would allow the vehicle engineer or designer to determine the traction force that will be needed at the wheels of the vehicle at various operating speeds when taking into account a wide variety of parameters such as engine displacement, drivetrain components, ambient temperatures, etc., and to enable the designer or engineer to better predict the needed vehicle configuration to meet the anticipated driving conditions.

SUMMARY OF THE INVENTION

The present invention relates to a method for determining the tractive effort required at the wheels of a vehicle under a given set of conditions and loads to maintain the vehicle at a desired speed. The method enables an engineer or designer to predict the tractive effort that will be required to move the vehicle at a desired speed under a wide variety of load conditions by simply inputting a number of variables relating to the various components of the vehicle such as the engine, transmission, vehicle weight, etc.

The method principally involves determining an approximate rolling effort required to maintain the vehicle moving at a speed in accordance with a desired speed; determining an aerodynamic influence factor representative of an aerodynamic resistance which the vehicle is to be exposed to at the desired speed; and using the approximate rolling effort and the dynamic influence factor to determine the total resistance force needed to be overcome to move the vehicle at the desired speed.

The step of determining the aerodynamic influence factor, in one preferred form of the method, comprises determining the drag coefficient of the vehicle and the vehicle's frontal area, and using these factors to determine the aerodynamic influence factor. Optionally, the drag coefficient of a trailer or any other implement which the vehicle is expected to tow, as well as the total frontal area of the implement, may be taken into consideration to further modify the aerodynamic influence factor.

In one preferred method of the present invention a total grade effort value is determined and also used in determining the total tractive effort value. The total grade effort value is determined by taking the grade of a surface on which the vehicle is expected to travel together with the gross vehicle weight and using these two factors to produce the total grade effort value. This force represents the force required to move the vehicle at a desired speed while the vehicle is travelling on the specified grade.

In another preferred form of the present invention the ambient temperature of the environment in which the vehicle is to be operated is taken into account together with the barometric pressure. These two factors are then combined to produce a correction factor which is also applied in determining the aerodynamic influence factor. In still another preferred form of the method, the static factor of one tire of the vehicle is taken into account together with a variable representing the tire tangential speed when the vehicle is traveling at the desired vehicle speed.

The method of the present invention therefore provides a means by which an engineer or vehicle designer can predict the tractive force which will be required at the wheels of a vehicle under a wide variety of operating conditions when using a wide variety of vehicle configurations. This information can be easily plotted in spread-sheet or graphical format with a personal computer or a lap top computer in readily available commercial software in graphical form and compared with existing data or graphs of output power available from specific engine, transmission and drive train packages. This enables the engineer to quickly determine, without actually testing a vehicle, whether the engine and drive train combination, as well as the vehicle aerodynamics, will likely permit the vehicle to perform under the conditions which engineers and designers expect will be required of the vehicle.

The method of the present invention further provides the significant advantage of providing a model into which a number of well known variables can be input to produce the tractive effort determinations needed to predict vehicle performance. Thus, the method of the present invention can be implemented even by individuals not having extensive engineering experience. The method further provides the advantage of standardizing how vehicle performance is predicted so that consistency and repeatability among vehicles of the same type, and further between different vehicles, can be achieved.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
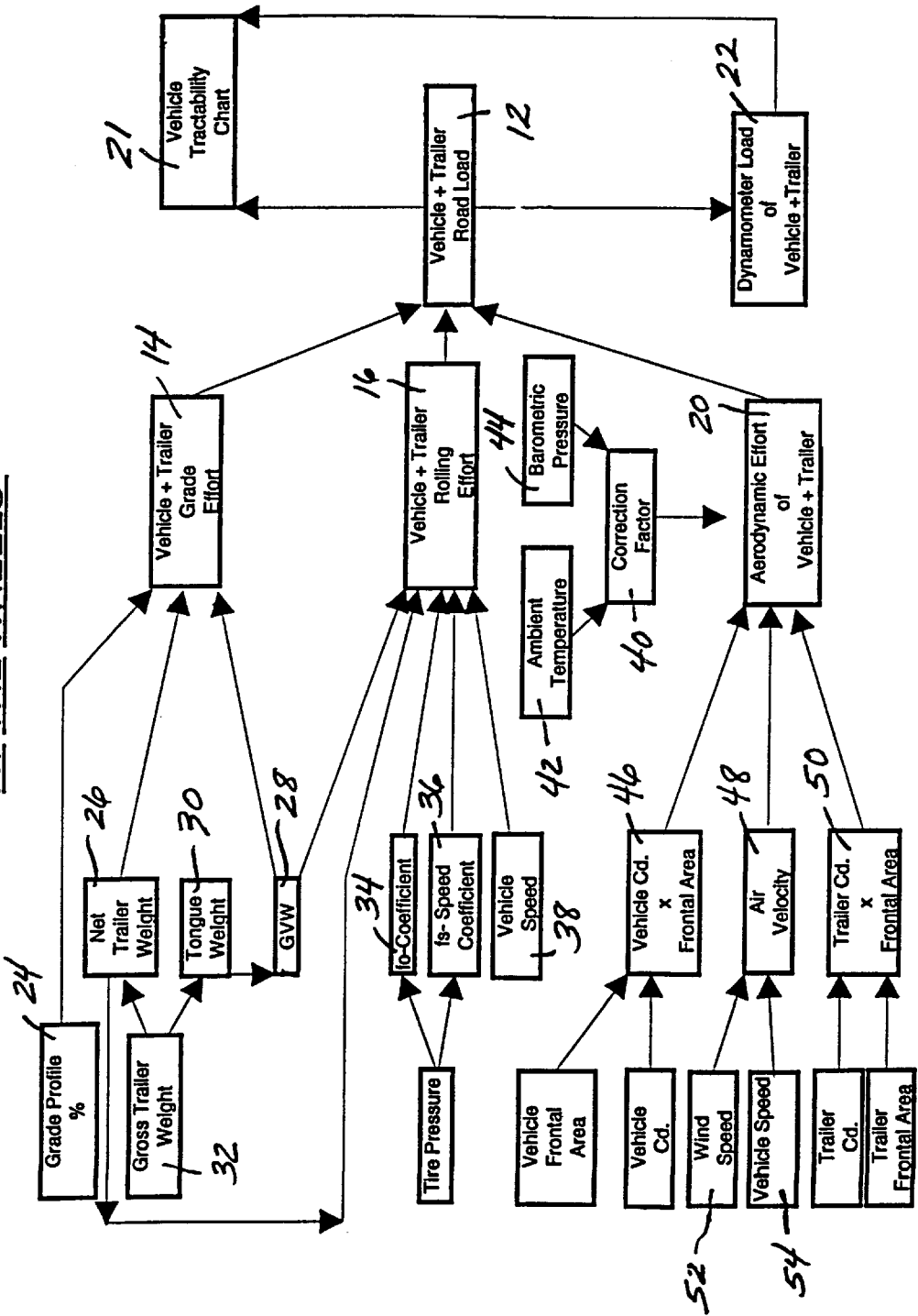
FIG. 1 is a flow chart of the method of the present invention illustrating the variables taken into account in determining the tractive force and power required at the wheels of a vehicle for the purpose of predicting vehicle performance under specified operating conditions and with specified engine, drive train and aerodynamic packages.

Referring to FIG. 1, a method 10 is illustrated for determining the tractive effort required at the wheels of a vehicle in accordance with a preferred embodiment of the present invention. Principally, the total tractive effort, as indicated at 12, is determined by summing a total grade effort force value generated at step 14, an approximate value of the rolling effort required to move the vehicle due to the hysterisis of the vehicle's tires, as indicated at step 16, and an aerodynamic influence factor generated at step 20, which is representative of the total air resistance which the vehicle experiences while moving at any given speed. The total tractive effort determination made at step 12, which therefore represents all of the train resistance forces (i.e, grade, aerodynamic and rolling forces), may be plotted on a vehicle tractability chart 21 and compared against a tractive force available at the wheels of a given vehicle model having a specific engine, specific drive train and specific aerodynamic package. This feature will be described in more detail in the following paragraphs.

The method of the present invention further can be used easily with conventional dynamometers. If so used, a dynamometer power absorption factor can be selected, as indicated at step 22, and applied to further help in predicting vehicle performance in a wind tunnel.

Referring further to FIG. 1, the total grade effort value at step 14 is determined by considering the grade profile, as indicated at step 24, the net weight of a trailer or any other object being towed by the vehicle, as indicated at step 26, and the gross vehicle weight, as indicated at step 28. The gross vehicle weight (GVW) is the total weight of the vehicle loaded to the maximum amount that the vehicle's tires or its structure permit, including the tongue weight, obtained at step 30, of the trailer or object being towed. As will be appreciated in the art, the tongue weight is that weight which the hitch of the vehicle "sees" when the trailer or object is secured to the hitch. The tongue weight at step 30 is readily derived in a well known manner from the gross trailer weight, as indicated at step 32. Taking the information obtained at steps 24, 26 and 28, the total grade effort value can be determined using the formula:

$$\text{Total Grade Effort} = GVW \cdot SIN(TAN^{-1}(GRADE/100))$$

where "GVW" equals the gross vehicle weight; and
"GRADE" equals the grade percentage value in step 24 of the grade of the surface that the tire pressure of at least one tire, the vehicle must travel on.

At step 16, the approximate total rolling effort is determined by taking the static factor of the tire, known in the industry as the tire's "fo-coefficient", as indicated at step 34, the tire tangential speed, which is also available from look-up tables known in the art and designated as the "fs speed coefficient", as indicated at step 36, and the vehicle speed at step 38, and using these factors in connection with the following formula:

$$\text{Total rolling effort} = \text{combined } GVW \cdot (fo + (fs \times 3.24) \times (MPH \div 100)^{2.5})$$

where fo-coefficient equals the rolling resistance of a radial tire as determined from a lookup table; and
where MPH equals the desired vehicle speed in miles per hour.

With further reference to FIG. 1, an environmental correction factor can optionally be determined, as indicated at step 40. This environmental correction factor, if incorporated, is determined by taking into account the ambient temperature, as indicated at step 42, and the barometric pressure, as indicated at step 44. These two factors are then used to generate the correction factor by the following formula:

$$\text{Temperature Correction Factor } (T_{COTT}) = (0.075 \div 32.174) \cdot (460 + 70) \cdot (460 + T) \cdot (P_b \div 29.92)$$

where T=the ambient temperature; and
Pb=barometric pressure.

The aerodynamic influence factor determined at step 20 is determined by taking into account the product of the vehicle drag coefficient ($Cd_v$) and the total frontal area of the vehicle, as indicated at step 46, the air velocity which the vehicle experiences, as indicated at step 48, and the product of the drag coefficient ($Cd_t$) of a trailer or other implement being towed by the vehicle and the total frontal area of the trailer or implement to calculate a total trailer drag coefficient, as indicated at step 50. The air velocity determined at step 48 is determined by taking into account the wind speed that the vehicle experiences, as indicated at step 52, and the vehicle speed, as indicated at step 54.

The aerodynamic influence factor is determined by the following formula:

$$1.076 \cdot \text{Total}_{cd} \cdot A \cdot T_{corr} \cdot \text{MPH}^2$$

where A=total frontal area of the vehicle and trailer or other implement being towed; and $\text{Total}_{cd}$=total combined drag coefficient of the vehicle and outside mirrors.

The total tractive effort value, determined at step 12, is determined by summing the force values determined at steps 14, 16 and 18 to produce a total force value representative of all the train resistance forces (i.e., grade, aerodynamic and rolling forces) which make up the tractive effort required at the wheels of the motor vehicle.

Figure 2:
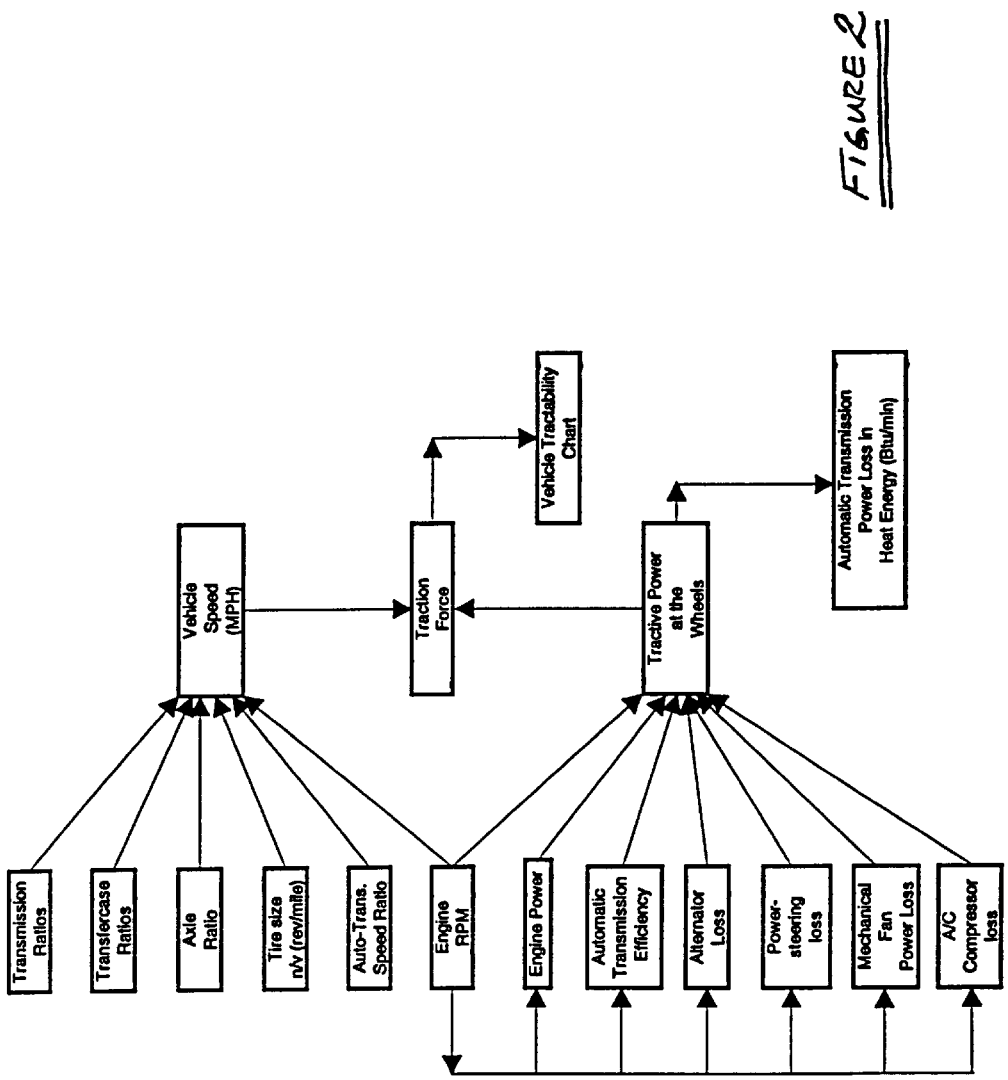
FIG. 2 is a flowchart of the factors typically taken into account in determining the tractive force available at the wheels of a vehicle.

Referring briefly to FIG. 2, one well known method of determining the traction force actually delivered to the wheels of a vehicle is illustrated. Using the method shown in FIG. 2, the traction force available at the wheels of the vehicle for a variety of vehicle speeds can readily be determined.

Figure 3:
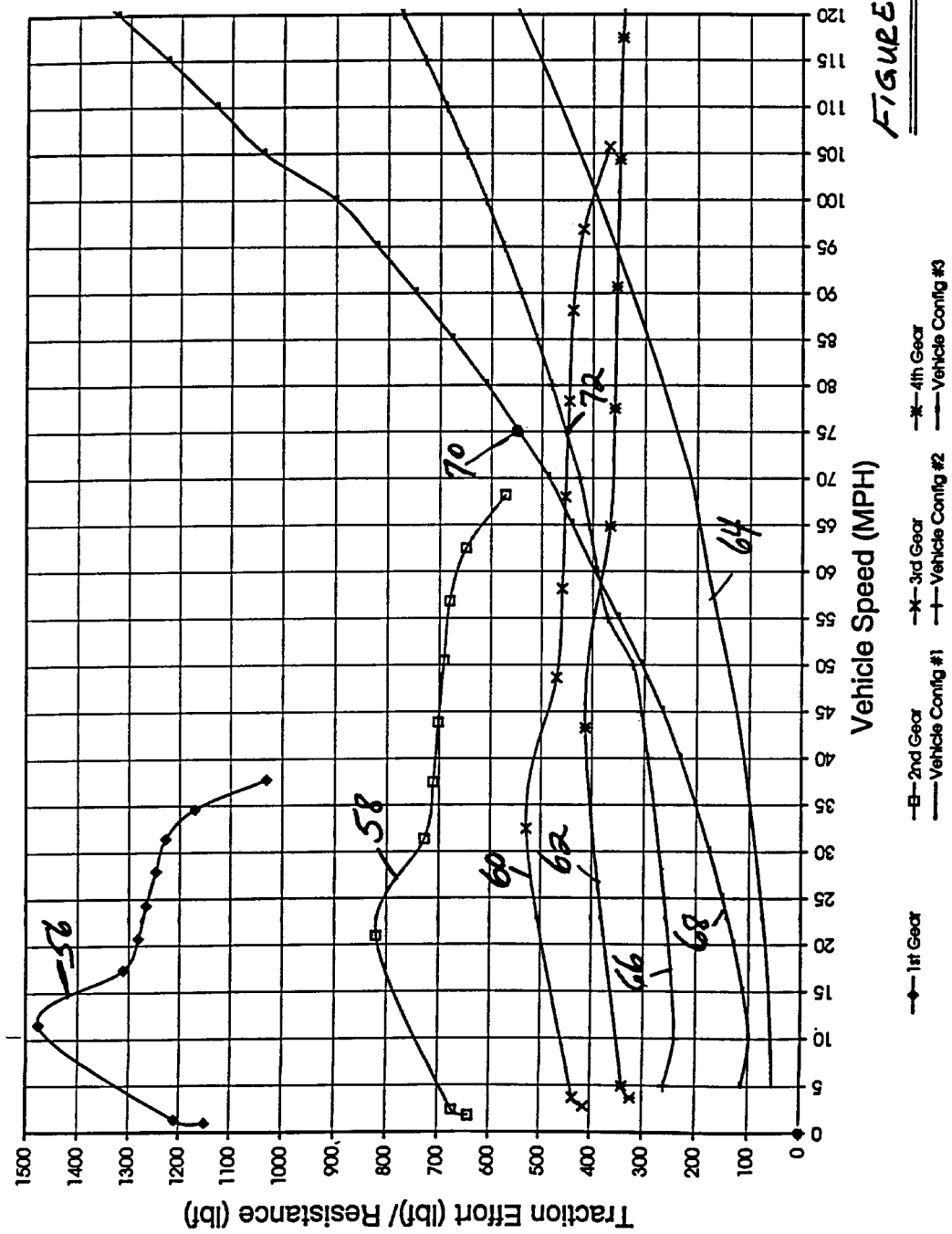
FIG. 3 is a graph illustrating the tractive force available at the vehicle wheels for different gears and one vehicle configuration and the tractive effort required at various vehicle speeds.

Referring now to FIG. 3, a graph illustrating the traction force delivered to the wheels of a vehicle in first gear, second gear, third gear and fourth gear, as well as three different vehicle configurations is illustrated. Curve 56 is the tractive force available in first gear at various vehicle speeds; curve 58 is the force available in second gear; curve 60 is the force available in third gear; and curve 62 is the force available in fourth gear. Curves 64, 66 and 68 represent the tractive force required at the wheels for three different vehicle configurations. From FIG. 3, it can be seen that, for example at point 70, the tractive effort required to sustain a vehicle speed of 75 MPH cannot be met in any one of first, second, third or fourth gears. Vehicle configuration number 2, as designated by curve 66, can, however, be met at this speed, as indicated by the intersection of curve 60 with curve 66 at point 72.

From FIG. 3 it will be appreciated that the method of the present invention allows vehicle engineers and designers to quickly determine if the vehicle will be able to provide the tractive force necessary at the wheels of a vehicle to meet the tractive force required under the designated conditions at various operating speeds. Accordingly, the engineer or designer can quickly determine if a particular vehicle configuration will simply not be able to provide sufficient tractive force to meet the tractive effort required under various operating conditions.

The method of the present invention further enables the engineer or designer to change one or more variables and to predict the tractive effort required at the vehicles wheels in advance of performing any actual testing on the vehicle. It will be appreciated that the method of the present invention can significantly streamline and accelerate the development and testing of various vehicle configurations by allowing designers to predict more closely the tractive effort required for different vehicle configurations and widely varying operating conditions prior to physically assembling and testing a vehicle having a particular configuration.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. A method for determining a total tractive effort required at the wheels of a motor vehicle under a given set of user selected variables, said method comprising the steps of:

determining an approximate total rolling effort required to maintain the vehicle moving at a speed in accordance with a desired speed;

determining an aerodynamic influence factor representative of an aerodynamic influence to which said vehicle is to be exposed to at said desired speed;

determining a total grade effort value representative of a total force required to move said vehicle at said predetermined speed along a surface having a predetermined grade;

using said aerodynamic influence factor, said approximate total rolling effort and said total grade effort value to determine said total tractive effort value representative of the total tractive effort required to move said vehicle along said surface at said desired speed;

wherein the step of determining an aerodynamic influence factor includes the steps of:

determining a total frontal area of a trailer which said vehicle is towing;

determining a drag coefficient of said trailer;

using said total frontal area of said trailer and said drag coefficient of said trailer to generate a total trailer drag coefficient; and using said total trailer drag coefficient in determining said aerodynamic influence factor.

2. The method of claim 1, wherein the step of determining said aerodynamic influence factor comprises the steps of:

determining a total frontal area of said vehicle;

determining a drag coefficient of said vehicle;

multiplying said total frontal area and said drag coefficient to produce a total drag coefficient value;

determining an ambient temperature and barometric pressure of an environment which said vehicle will be exposed to and using said ambient temperature and said barometric pressure to generate a correction factor;

determining a speed of wind which said vehicle experiences and using said speed of said wind to determine an air velocity value; and using said total drag coefficient value, said correction factor and said air velocity value in determining said aerodynamic influence factor.

3. The method of claim 2, further comprising the steps of:

determining a tire pressure of at least one tire of said vehicle;

determining a static factor of said one tire;

determining an fs-speed coefficient related to the tangential speed of said tire; and using said tire pressure, said static factor and said fs-speed coefficient to determine said total rolling effort.

4. A method for determining a total tractive effort required at the wheels of a motor vehicle under a given set of user selected variables, said method comprising the steps of:

determining an approximate total rolling effort required to maintain the vehicle moving at a speed in accordance with a desired speed, including the steps of:

determining a tire pressure of at least one tire of said vehicle;

determining a static factor of at least one tire;

determining an fs-speed coefficient related to a tangential speed of said tire;

determining an aerodynamic influence factor representative of an aerodynamic influence to which said vehicle is to be exposed to at said desired speed;

determining a total grade effort value representative of a total force required to move said vehicle at said predetermined speed along a surface having a predetermined grade; and using said aerodynamic influence factor, said approximate total rolling effort and said total grade effort value to determine said total tractive effort value representative of the total tractive effort required to move said vehicle along said surface at said desired speed.

5. The method of claim 4, wherein the step of determining said aerodynamic influence factor comprises the steps of:

determining a total frontal area of said vehicle;

determining a drag coefficient of said vehicle;

multiplying said total frontal area and said drag coefficient to produce a total drag coefficient value; and using said total drag coefficient value in determining said aerodynamic influence factor.

* * * * *